US005615072A

United States Patent [19]

Hofsäss et al.

[11] Patent Number: 5,615,072

[45] Date of Patent: Mar. 25, 1997

[54] TEMPERATURE-SENSITIVE SWITCH

[75] Inventors: Marcel Hofsäss, Pforzheim; Dieter Bühling, Hermsdorf, both of Germany

[73] Assignee: Thermik Gerätebau GmbH, Pforzheim, Germany

[21] Appl. No.: 513,194

[22] Filed: Aug. 9, 1995

[30] Foreign Application Priority Data

Aug. 10, 1994 [DE] Germany .......................... 44 28 226.5

[51] Int. Cl.⁶ ........................................ H02H 5/04

[52] U.S. Cl. ............................ 361/24; 361/32; 361/105; 337/107

[58] Field of Search .................................. 361/105, 103, 361/106, 23–24, 26–27, 32; 337/335, 377, 333–334, 380, 102–104, 100, 107

[56] References Cited

U.S. PATENT DOCUMENTS

| | | | |
|---|---|---|---|
| 4,849,729 | 7/1989 | Hofsäss | 337/102 |
| 5,367,279 | 11/1994 | Sakai | 337/104 |

FOREIGN PATENT DOCUMENTS

| | | |
|---|---|---|
| 0342441 | 11/1989 | European Pat. Off. . |
| 8411838 | 6/1984 | Germany . |
| 3401968 | 7/1984 | Germany . |
| 3632256 | 4/1987 | Germany . |
| 4142716 | 6/1993 | Germany . |
| 4336564 | 5/1994 | Germany . |

*Primary Examiner*—Jeffrey A. Gaffin
*Assistant Examiner*—Michael J. Sherry
*Attorney, Agent, or Firm*—Harness, Dickey & Pierce, P.L.C.

[57] ABSTRACT

A temperature-sensitive switch (10) for protecting electrical parts against excess temperature and/or excess current comprises a bimetallic switching device (14) which opens or closes its contacts in response to an excess temperature. Said switching device (14) is contained in a casing (17) having a pot-like bottom part (18) and cover (19). A first heating resistor (15) is connected in circuit with the switching device (14) such that it locks the switching device (14) in a self-holding manner when said switching device (14) is actuated in response to an excess temperature. A second heating resistor (16) is connected in circuit with said switching device (14) and produces heat in response to a current flow therethrough. When an excess current flows through the second heating resistor (16) the switching device (14) is actuated. Both, the first and second heating resistors (15, 16) are integrated in said cover (19) of said casing (17).

10 Claims, 2 Drawing Sheets

TEMPERATURE-SENSITIVE SWITCH

BACKGROUND OF THE INVENTION

The present invention relates to a temperature-sensitive switch, in particular for electrical parts to be protected against excess temperature and/or excess current, such as e.g. electrical motors and transformers.

A prior art temperature-sensitive switch is known from document DE-A 43 36 564. The known temperature-sensitive switch comprises a bimetallic switching device opening or closing its contacts in response to an excess temperature, a casing having a pot-like lower part and a cover part, for containing said switching device, a first heating resistor connected in circuit with said switching device such that it locks said switching device in a self-holding manner when said switching device is actuated, and a second heating resistor connected in circuit with said switching device and producing heat in response to a current flow therethrough, such that said switching device is actuated by an excess current flowing through said second heating resistor.

The first heating resistor is connected in parallel and the second heating resistor is connected in series to the switching device.

The known temperature-sensitive switch consists of a ceramic base plate provided with conductive and insulating coatings on which an encapsulated bimetallic switching device is arranged, alongside which there is a posistor module (PTC resistor) connected in parallel to the bimetallic switching device which functions as the first heating resistor. The ceramic base plate also bears a thick film resistor leading beneath the bimetallic switching device which is connected in series to this circuit.

The object of the known temperature-sensitive switch is to interrupt the current flow through the electrical part if the temperature of the part or the current flowing through the part become too high. For this purpose the known temperature-sensitive switch is connected in series to the part so that the current flowing through the part also flows through the temperature-sensitive switch, whereby the bimetallic switching device remains closed at temperatures below the release temperature and/or at currents below the release current.

The operating current of the part flows through the second heating resistor of a few ohms, which is connected in series, and through the closed contacts of the bimetallic switching device, which bridges the first heating resistor. If the temperature of the part now exceeds a given threshold value the bimetallic switching device, which has thermal contact with the part, suddenly opens its contacts inasmuch as a bimetallic snap switch inside the bimetallic switching device is triggered. The current now flows through the series connected heating resistor and through the second heating resistor which displays such a high resistance that the current is much lower than the original operating current so that the part is quasi switched off. On account of the posistor characteristics of the second heating resistor the current drops when this heating resistor heats up. As a result of the heat radiated and/or conducted by this heating resistor the bimetallic snap switch continues to be heated so that it is automatically locked in its position with the contacts open. This prevents an automatic reclosure if the part which has been switched off on account of an excess temperature cools down, which could lead to so-called "contact flutter" with periodic reconnections and disconnections and which is generally undesired.

However, if the current flowing through the part, and thus also the bimetallic switching device, and not the temperature reaches a given threshold value the series connected heating resistor heats up to a point where the switching device finally reaches its release temperature and opens. The switch is hereby locked in the same manner as described above.

Although the known temperature-sensitive switch meets all functional requirements its disadvantage is its relatively bulky and large size, due particularly to the ceramic base plate. For reasons of installation and thermal capacity such temperature-sensitive switches are normally of a very small design, for example with a diameter of 10 mm and a height of 5 mm, which places extreme demands on the manufacturing accuracy and is also the reason for the necessity of a simple and at the same time functionally reliable construction.

Such a miniature temperature-sensitive switch is known from EP-A 0 342 441 and DE-A 37 10 672. This temperature-sensitive switch is of a locking embodiment, though it displays no excess current sensitivity. In other words, the known temperature-sensitive switch comprises a heating resistor connected in parallel to the bimetallic switching device whose effect is similar to that described above in connection with the first heating resistor. There is no series connected second heating resistor.

In order to keep the overall size of the known temperature-sensitive switch small the high-resistance parallel resistor is integrated in the casing of the bimetallic switching device. This casing comprises a pot-shaped bottom part and corresponding cover made of either insulating material or an electrically conductive high-resistivity material.

The casing contains a bimetallic snap switch and spring washer bearing a movable contact which is assigned a fixed contact borne by the cover. The spring washer presses the moveable contact against the fixed contact and simultaneously conducts the current flowing through the contact to the bottom part, to which a first external contact is fixed. The second external contact of the known temperature-sensitive switch is arranged on the cover and makes electrically conductive contact with the fixed contact of the bimetallic switching device through the cover. The bimetallic snap switch acts on the spring washer and if a given release temperature is exceeded it suddenly snaps, thus raising the moveable contact from the fixed contact so that the flow of current through the bimetallic switching device is interrupted.

The current now flows through the parallel connected heating resistor and thus leads to the aforementioned locking. This heating resistor can consist either of the high-resistivity material of the cover or can be printed on the cover if this is made of insulating material.

The disadvantage of this known temperature-sensitive switch is that if provides no protection against excess current. A further disadvantage is that the design variant where the cover is made of electrically conductive high-resistivity material requires an insulating envelope between the cover and bottom part to ensure a defined current path and thus a defined resistance. However, if the heating resistor consists of a printed strip resistance, the disadvantage here is that this strip resistance must be helical and/or in curves so as to achieve the desired resistance value and current path. The disadvantages in both cases relate to the high manufacturing costs.

A similar miniature embodiment for a temperature-sensitive switch is also known from DE-A 41 42 716, without a locking function through a parallel connected heating resistor, though with a series connected heating resistor integrated in a very small space which monitors the current. The protective resistor is arranged as an etched or punched part or as a film printed with a resistor in the immediate vicinity of and in thermal and electrical contact with the spring washer of the bimetallic switching device in such a way that it lies in the base of the bottom part of the casing.

Apart from the complicated assembly of the known temperature-sensitive switch a further disadvantage is that the etched or punched parts used as heating resistors are relatively inaccurate with respect to the resistance values and can only be manufactured for a small resistance range. An additional insulating part between the casing bottom and the heating resistor and in most cases an additional externally mounted high-resistance resistor in series with the aforementioned protective resistor are needed for reasons of resistance adjustment, which increases the overall manufacturing costs and overall size.

Bimetallic safety switches are generally known in a pot shape and only display one of the two protective functions mentioned at the beginning with respect to temperature and current.

DE-A 36 32 256, for example, describes a temperature-sensitive switch with locking function which only reacts to excess current, whereby the heating resistor consists of a freely clamped resistance wire spiral close to the bimetallic element. The disadvantages here are the high spatial requirements, possible fluctuations in the orientation to the bimetallic element and corresponding fluctuations in thermal transfer as well as contact problems at the connections of the resistance wire spiral.

From DE-C 34 01 968 it is known that the electrical contact of the bimetallic element can even be made of a high-resistance material so that this also heats up at excess current, leading to a steeper characteristic curve for the triggering of the temperature-sensitive switch depending on the amount of excess current. The transfer of heat to the bimetallic element is hereby better and safer than in the aforementioned solution, though the spatial requirements, particularly in a radial direction, are so high that a pot-shaped embodiment is no longer possible. Moreover, the resistance elements have a complicated shape which is difficult to manufacture whereby a direct passage of current through the bimetallic element itself leads to a more inexact switching than with a bimetallic element which is only heated by a special protective resistor.

SUMMARY OF THE INVENTION

In view of the above, it is an object of the present invention to improve the temperature-sensitive switch mentioned at the outset so that the aforementioned disadvantages can be avoided. In particular, a smaller, more compact and easier to manufacture temperature-sensitive switch is to be developed which is triggered at both excess current and excess temperature and which displays a locking function.

This object is achieved in accordance with the invention inasmuch as the first and second heating resistors are integrated in the cover.

The object on which the invention is based is solved completely in this manner. The inventor has namely recognized that this constructive measure enables the embodiment of a compact temperature-sensitive switch which can be made at low cost even during the serial production of known temperature-sensitive switches simply by replacing a new cover. The integration of both heating resistors in the cover also has the advantage that the number of electrical contact points can be reduced compared to the prior art, leading to a higher reliability of the temperature-sensitive switch.

In a further embodiment it is preferable if the bimetallic switching device comprises a fixed contact part held on the cover and a movable contact part borne on a spring snap washer which is moved by a bimetallic snap switch.

All parts of the temperature-sensitive switch are thus located in the casing in this sturdy and compact embodiment, which facilitates installation by the user.

On the whole it is preferable if the first heating resistor is connected in parallel and the second heating resistor in series to the bimetallic switching device, which opens at excess temperature.

This is a preferred embodiment of the new temperature-sensitive switch, opening at excess temperature, although it is also possible to design the new temperature-sensitive switch in such a way that it closes at excess temperature. In the latter case the first heating resistor, which is responsible for the locking function, would have to be connected in series to the bimetallic switching device whereas the second heating resistor which determines the temperature sensitivity would have to be arranged parallel to the series connection of the first heating resistor and bimetallic switching device. In this case the temperature of the part to be monitored and for example the current flow through a control unit would be monitored so that two monitoring functions are fulfilled by one single temperature-sensitive switch. If the new temperature-sensitive switch opens due to excess temperature at the part, the current through the control unit would be greatly reduced, which could be used to switch off the control unit. On the other hand an excess current through the control unit which could damage the part is simultaneously monitored since this excess current through the parallel connected second heating resistor would lead to a closure of the bimetallic switching device so that the current then no longer flows through the parallel connected low-resistance heating resistor but through the series connected high-resistance heating resistor.

In one embodiment it is preferable if the cover is made at least partly of insulating material and if the first and/or second heating resistor as well as their connections are laminated onto the insulating material, preferably printed onto this.

It is also preferable if the cover is made at least partly of electrically conductive material, preferably posistor material, which is designed as the first or second heating resistor.

The advantage of these two embodiments is that the series connected heating resistor is laminated onto either a deposited insulating layer or onto a separate, prefabricated film. In the latter case the film is applied with the resistive coat and connected to the pot-shaped bottom part by crimping together with the actual cover, which can be made of insulating material or posistor material. This method of manufacture is helpful in that the film compensates any irregularities in the cover and/or crimping tool.

It is hereby preferable if the electrically conductive material forms the first heating resistor and if an insulating layer is applied onto this, onto which the second heating resistor is laminated, preferably printed.

Furthermore, it is preferable if the second heating resistor is mounted on the upper side of the cover pointing away from the bottom part and if one of its terminals is connected to the fixed contact part and the other terminal to the first external connection mounted on the cover.

The advantage of this embodiment is that a number of functions can be integrated into the new cover without complicated manufacturing procedures, which also in principle reduces the space requirements. Although the series connected heating resistor lies on that side of the cover facing away from the bimetallic snap switch, this embodiment reduces the time up to triggering due to excess temperature through a certain preheating of the parallel connected heating resistor. This in turn lead to a safer triggering of the new temperature-sensitive switch.

On the whole it is then preferable if the laminated heating resistor(s) display(s) a structure which helps determine the resistance, preferably by means of a lateral segment which determines the resistance being left out.

The advantage of this is that the heating resistor is printed simply as a continuous surface whereby the resistance is determined by a segment which is left free, thus in turn displaying advantages in terms of manufacturing over the curved or spiral-shaped arrangement known from state of the art embodiments It is furthermore preferable if the first and/or second heating resistor are connected to the bimetallic switching device by ring-shaped terminals arranged on the cover.

The advantage of this measure is that ring-shaped, i.e. centrally symmetrical structures can be applied uniformly when printing strip conductors whereby a further advantage is that no special attention has to be paid to a particular angular alignment of the bottom part and cover during assembly of the new temperature-sensitive switch.

It is furthermore preferable if the layer arrangement is covered by a preferably electrically insulating protective coat.

The advantage of this is that the temperature-sensitive switch can be assembled by even inexperienced, basically trained personnel since the risk of incorrect installation with additional accidental contacts between the resistive layers can be avoided.

Further advantages arise from the description and the enclosed drawing.

BRIEF DESCRIPTION OF THE DRAWING

It is understood that the features mentioned above and those to be explained in the following are applicable not only for the specified combinations but also in other combinations or on their own without going beyond the scope of the present invention.

The invention is shown in the drawing and will be described in more detail in the following description. The illustrations show the following.

DETAILED DESCRIPTION OF THE PREFERRED EMBODIMENT

Figure 1:
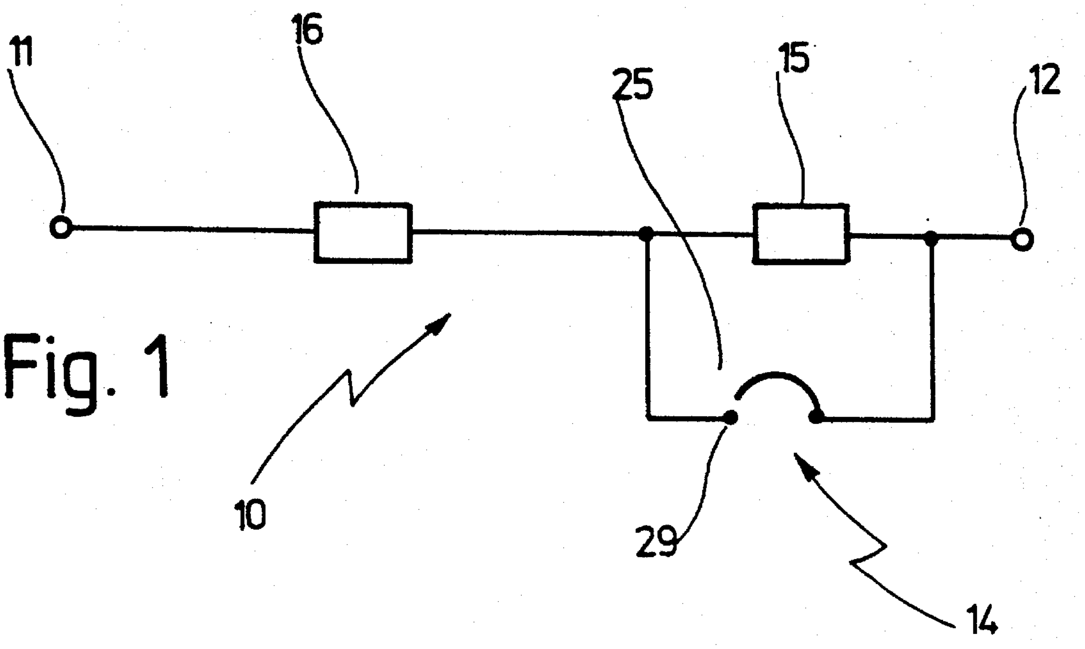
FIG. 1 a circuit sketch of a temperature-sensitive switch for excess temperature and excess current protection with locking function.

FIG. I shows a schematic block diagram of a temperature-sensitive switch 10 displaying a first external connection 11 and a second external connection 12 via which the temperature-sensitive switch 10 is connected in series to an electrical part, for example an electric motor or a transformer. The temperature-sensitive switch 10 consists of a bimetallic switching device 14 which is connected in parallel to a first heating resistor 15. A second heating resistor 16 is connected in series to the parallel circuit of the bimetallic switching device 14 and first heating resistor 14 which generally displays a much lower ohmic resistance than the first heating resistor 15. The bimetallic switching device makes thermal contact with the electrical part to be monitored.

If the bimetallic switching device 14 displays a temperature below its release temperature the first heating resistor 15 is short circuited by the bimetallic switching device 14 so that the operating current of the part only flows through the second heating resistor 16, which similarly makes thermal contact with the bimetallic switching device 14. If the temperature of the bimetallic switching device now rises, due either to an increase in temperature of the electrical part to be monitored or to an excess operating current through the second heating resistor 16, which heats up correspondingly, the bimetallic switching device 14 opens when it exceeds its release temperature. The short circuit across the first heating resistor 15 is hereby cancelled so that the operating current now flows through the first heating resistor 15 which is now connected in series to the second heating resistor 16. Since the first heating resistor 15 has a much higher ohmic resistance than the second heating resistor 16, the operating current is significantly reduced which usually leads to the electrical part being switched off. However, the operating current which continues to flow is high enough to keep the bimetallic switching device 14 at a temperature above its release temperature through the ohmic heating of the first heating resistor 15. Even when the part has cooled down the bimetallic switching device 14 remains at the higher temperature and thus open so that no undesired contact flatter occurs. The same applies if the bimetallic switching device 14 has triggered due to excess current, in other words if the second heating resistor 16 has been heated up by the excess operating current to such an extent that the temperature of the bimetallic switching device 14 rises above its release temperature on account of the thermal contact between the resistor and the switching device.

Figure 2:
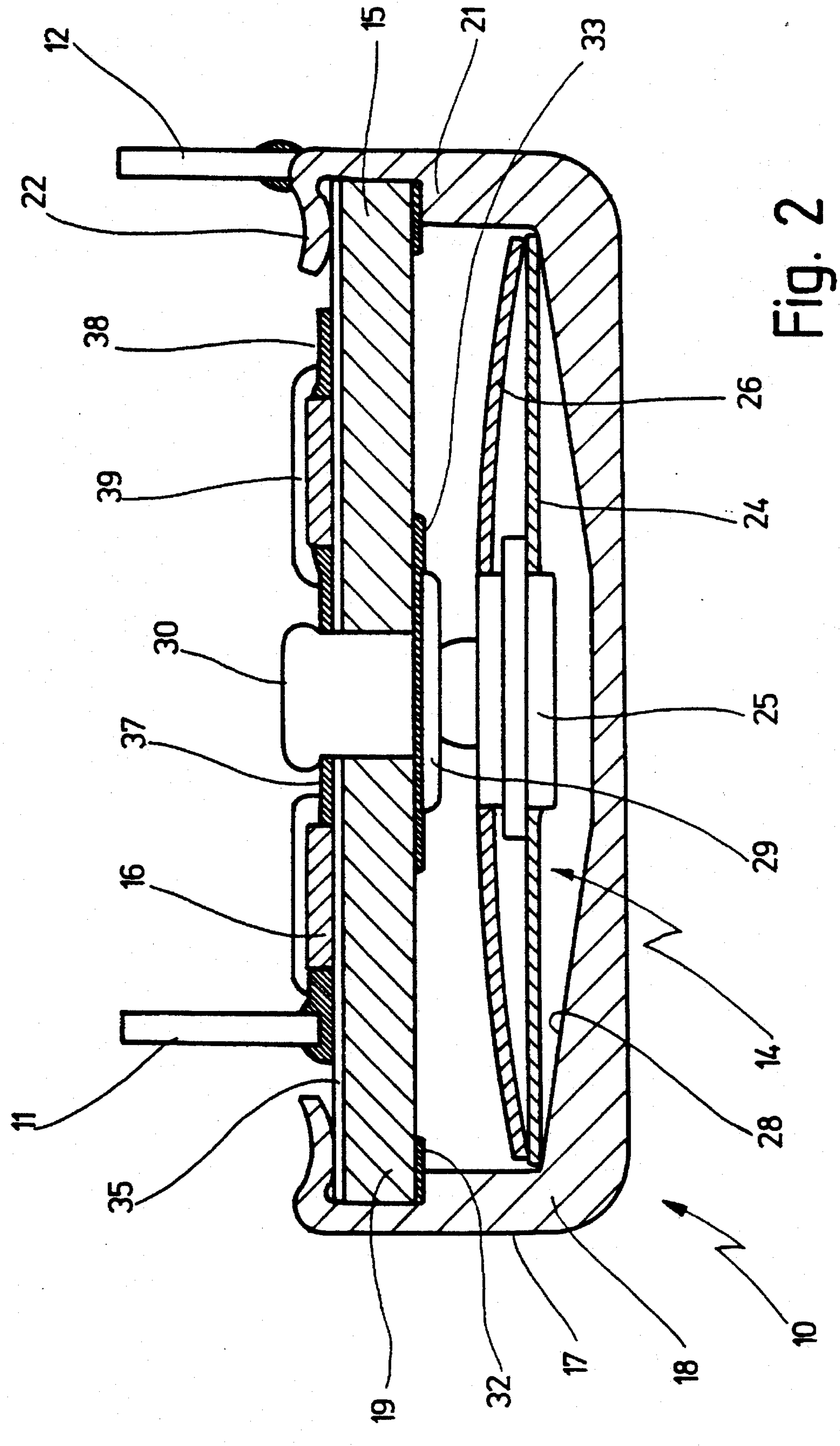
FIG. 2 an axial section through a new temperature-sensitive switch.

FIG. 2 shows an axial section of a preferred embodiment of the new temperature-sensitive switch 10. The new temperature-sensitive switch 10 consists of a casing 17 with a pot-shaped bottom part 18 and a cover 19 resting on the peripheral collar 21 of and closing the bottom part 18. The casing is closed by a flared flange 22 which presses the cover 19 onto the peripheral collar 21.

The bimetallic switching device 14, of a normal construction, is located inside the casing 17. The bimetallic switching device consists of a spring washer 24 bearing a movable contact part 25 over which a bimetallic snap switch 26 is mounted. The spring washer 24 rests on a base 28 of the pot-shaped bottom part 18 and thus presses the movable contact part 25 against a fixed contact part 29 which protrudes through the top of the cover 19 similar to a rivet and which displays a visible head 30.

In the state shown in FIG. 2 the bimetallic switching device 14 has a temperature below its release temperature so that it is closed. If the temperature of the bimetallic switching device 14 rises the bimetallic snap switch 26 suddenly snaps from the convex shape shown into a concave shape and rests against the underside of the cover 19 in such a way that it raises the movable contact part 25 from the fixed contact part 29 against the force of the spring washer 24 in the generally known manner.

The embodiment of the cover 19 is decisive for the new temperature-sensitive switch 10 since its basic body which assumes a number of functions serves as the first heating resistor 15, which in this case is a ceramic posistor heating resistor. In the sectional diagram in FIG. 2 the layers which will be described in the following are exaggerated. The underside of the cover 19 which points to the inside of the casing 17 bears two ring-shaped strip conductors or contacts 32, 33 which are made by a printed and burnt-in silver paste. Whereas the strip contact 32 rests on the collar 21 and ensures a good electrical contact between the heating resistor 15 and the bottom part 18 made of electrically conductive material, the strip contact 33 is in the area of the fixed contact part 29 and ensures a corresponding electrically conductive connection between the heating resistor 15 and the contact part 29. Since the second external connection 12 is soldered onto the flared flange 2, the heating resistor 15 is connected in parallel to the switching device 14 on account of the arrangement described here and is thus bridged by this when the switching device 14 is closed.

The upper side of the cover 19 which faces outwards bears an insulating coat 35 onto which a resistive coat is applied by means of mask printing. This resistive layer forms the heating resistor 16 with a resistance value of 0.1 to 10 Ω. Circular strip contacts 37, 38 of silver paste are also printed onto this for contact purposes of which strip contact 37 connects the second heating resistor 16 to the fixed contact part 29. The external strip contact 38 makes connection with the first external connection 11. It can also be seen in FIG. 2 that the resistive layer 16 is covered by a protective coat which provides mechanical and electrical protection.

As a result of this arrangement the second heating resistor 16 is connected in series between the first external connection 11 and the fixed contact part 29 so that the arrangement as shown in FIG. 2 is very compact and need only be integrated in the cover 19 to produce the temperature-sensitive switch with excess current and excess temperature protection as well as locking function as shown in the block diagram in FIG. 1.

Figure 3:
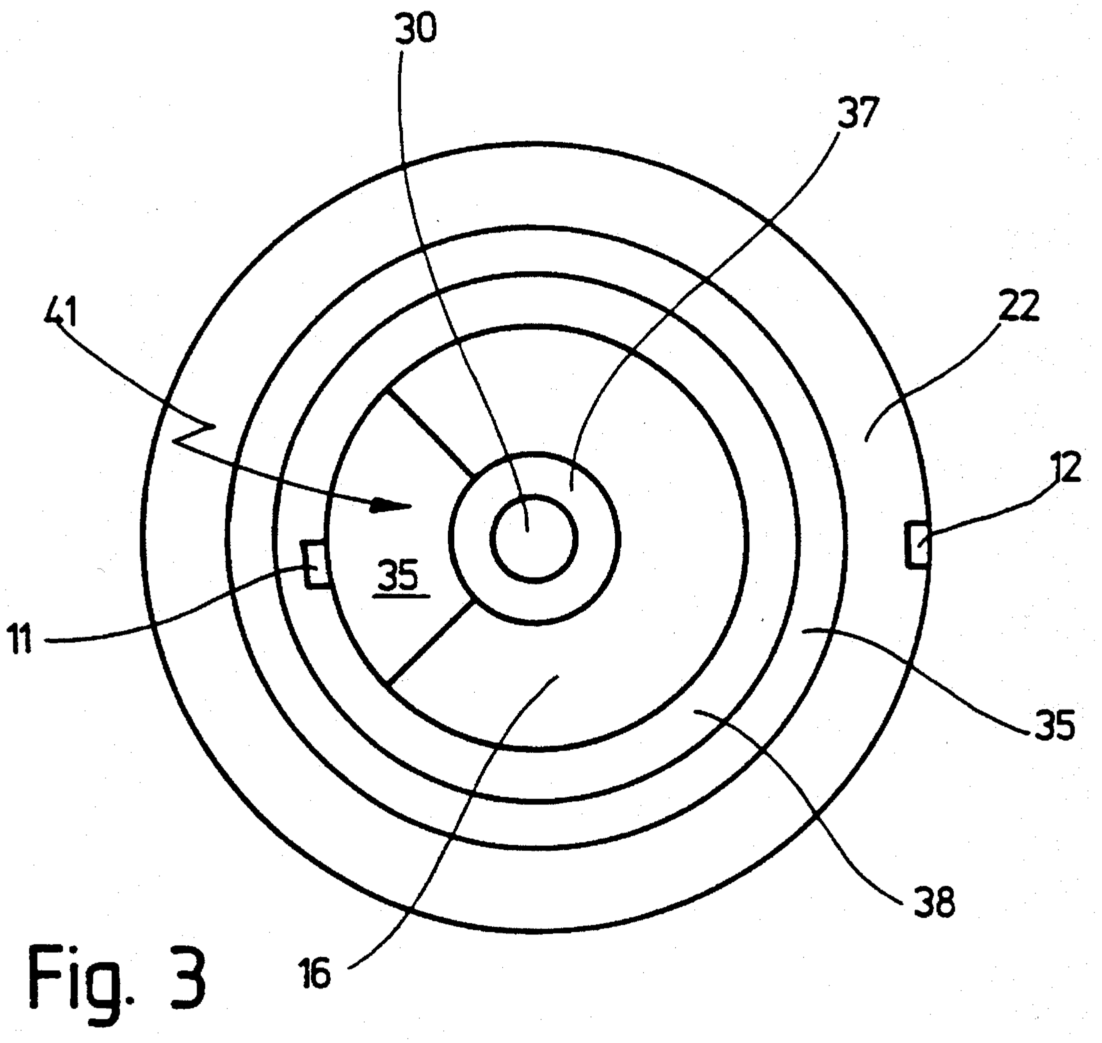
FIG. 3 a top view of the cover of the temperature-sensitive switch shown in FIG. 2.

Whereas the resistance value of the first heating resistor 15, responsible for the locking function, only has to be large enough so that the ohmic heat produced therein leads to a heating which holds the bimetallic snap switch 26 at a temperature above its release temperature, in other words is relatively uncritical with respect to the resistance dimensioning, the second heating resistor 16 is responsible for the excess current sensitivity and thus has to be adjusted and set more accurately. FIG. 3 shows how this is done.

FIG. 3 shows a top view of the temperature-sensitive switch 10 from FIG. 2, whereby the protective coat 39 has been omitted for the sake of clarity.

It can be seen that the second heating resistor 16 is not a complete annular layer but is formed by an annular segment, whereby a section 41 has been left out. The heating resistor 16 can be seen as a parallel circuit of a number of smaller elementary resistances between the ring-shaped strip conductors 37 and 38 so that if the section 41 is enlarged or reduced the resistance value of the heating resistor 16 is enlarged or reduced. This means that the resistance value of the heating resistor 16 can thus be altered very easily at later dates. Since the heating resistor 16 points outwards this can even be carried out on fitted temperature-sensitive switches 10.

It should also be mentioned that the resistance value of the heating resistor 16 must be set so that the ohmic heat generated by the rated operating current which flows through the heating resistor is sufficient to heat the bimetallic snap switch 26 to above its release temperature.

Finally, it should also be mentioned that the cover 19 can also be made of an insulating material whereby the first heating resistor 15 can also be designed as a film resistor, in this case on the inside of the cover 19. This film resistor would lie between strip contacts 32 and 33 in the same way that film resistor 16 lies between strip contacts 37 and 38 so that the first heating resistor 15 is still connected in parallel with the bimetallic switching device 14.

We claim:

1. A temperature-sensitive switch for protecting electrical parts such as motors and transformers against excess current and excess temperature, comprising:

a bimetallic switching device opening or closing its contacts in response to an excess temperature;

a casing having a pot-like lower part and a cover part, for containing said switching device;

a first heating resistor connected in circuit with said switching device, such that it locks said switching device in a self-holding manner when said switching device is actuated; and a second heating resistor connected in circuit with said switching device and producing heat in response to a current flow therethrough, such that said switching device is actuated upon an excess current flowing through said second heating resistor, both said first and said second heating resistors being integrated in said cover part.

2. Temperature-sensitive switch of claim 1, wherein the bimetallic switching device comprises a stationary contact part fixed to the cover part and a movable contact part borne on a spring washer to be actuated by a bimetallic snap disk.

3. Temperature-sensitive switch of claim 2, wherein the first heating resistor is connected in parallel and the second heating resistor in series to said bimetallic switching device, said bimetallic switching device opening at excess temperature.

4. Temperature-sensitive switch of claim 1, wherein said cover part is made at least partly of insulating material and said first and/or second heating resistor as well as their terminals are laminated onto said insulating material, preferably printed onto the latter.

5. Temperature-switching device of claim 1, wherein said cover part is made at least partly of electrically conductive material, preferably of a material with positive temperature coefficient (PTC), said PTC material being provided as said first or second heating resistor.

6. Temperature-switching device of claim 5, wherein the electrically conductive material forms said first heating resistor, an insulating layer is applied onto the electrically conductive material, and the second heating resistor is laminated, preferably printed onto the insulating layer.

7. Temperature-sensitive switch of claim 6, wherein the second heating resistor is provided on a side of the cover part facing away from said bottom part, one of the terminals of said second heating resistor being connected to the stationary contact part and the other of the terminals being connected to a first external connection provided on said cover part.

8. Temperature-sensitive switch of claim 7, wherein said laminated heating resistor(s) display(s) a structure defining at least partly the resistance of said resistor(s), a lateral segment of said structure preferably being left out.

9. Temperature-sensitive switch of claim 1, wherein said first and/or second heating resistor are connected to said bimetallic switching device by ring-shaped terminals arranged on said cover part.

10. Temperature-switching device of claim 4, wherein the layer arrangement is covered by a preferably electrically insulating protective coat.

* * * * *